US012545544B2

(12) United States Patent
Murata

(10) Patent No.: US 12,545,544 B2
(45) Date of Patent: Feb. 10, 2026

(54) PRINTER AND PAPER CONVEYANCE APPARATUS

(71) Applicant: TOSHIBA TEC KABUSHIKI KAISHA, Tokyo (JP)

(72) Inventor: Tomomasa Murata, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 125 days.

(21) Appl. No.: 18/429,484

(22) Filed: Feb. 1, 2024

(65) Prior Publication Data

US 2024/0327162 A1 Oct. 3, 2024

(51) Int. Cl.

| | |
|---|---|
| ***B41J 15/16*** | (2006.01) |
| ***B41J 3/407*** | (2006.01) |
| ***B41J 15/02*** | (2006.01) |
| ***B41J 15/04*** | (2006.01) |
| ***B41J 29/13*** | (2006.01) |
| ***B65H 23/16*** | (2006.01) |

(52) U.S. Cl.

CPC ............ *B65H 23/16* (2013.01); *B41J 3/4075* (2013.01); *B41J 15/02* (2013.01); *B41J 15/046* (2013.01); *B41J 29/13* (2013.01); *B65H 2402/441* (2013.01)

(58) Field of Classification Search

CPC ... B41J 2/32; B41J 3/4075; B41J 15/02; B41J 15/04; B41J 15/042; B41J 15/046; B41J 29/13; B65H 23/16; B65H 2402/441; B65H 2801/12; B65H 2403/942

See application file for complete search history.

(56) References Cited

U.S. PATENT DOCUMENTS

2018/0194584 A1 7/2018 Kokuta et al.

FOREIGN PATENT DOCUMENTS

WO WO-2018043378 A1 * 3/2018 ............. B65H 23/16

OTHER PUBLICATIONS

Extended European Search Report for European Patent Application No. 24158937.3 dated Jun. 25, 2024.

* cited by examiner

*Primary Examiner* — Christopher E Mahoney

*Assistant Examiner* — Marissa Ferguson-Samreth

(74) *Attorney, Agent, or Firm* — Amin, Turocy & Watson, LLP

(57) ABSTRACT

A printer equipped with a storage portion capable of storing front-wound continuous paper with a printing surface on a front side and back-wound continuous paper with a printing surface on a back side, the printer including a main body, a cover capable of being opened and closed relative to the main body, a print head that prints on the printing surfaces of the front-wound continuous paper and the back-wound continuous paper pulled out from the storage portion, a damper for back-wound continuous paper provided in the main body and capable of being urged in a direction abutting on a non-printing surface of the back-wound continuous paper pulled out from the storage portion, and a damper for front-wound continuous paper provided on the cover and capable of being urged in a direction abutting on the printing surface of the front-wound continuous paper pulled out from the storage portion.

18 Claims, 7 Drawing Sheets

PRINTER AND PAPER CONVEYANCE APPARATUS

CROSS-REFERENCE TO RELATED APPLICATION

This application is based upon and claims the benefit of from Japanese Patent Application No. 2023-051714, priority filed on Mar. 28, 2023, the entire contents of which are incorporated herein by reference.

FIELD

Embodiments described herein relate generally to a printer and a paper conveyance apparatus.

BACKGROUND

In the printer that conveys and prints a paper sheet such as a label and a receipt, continuous paper wound in a roll shape is stored. For example, if the paper sheet set for printing is conveyed, the paper sheet is suddenly pulled and the tension between the conveyed paper sheet and the continuous paper increases, which may result in generation of an impact between the continuous paper and the paper sheet that is pulled out. In the case of the printer, the generated impact may affect print quality. Therefore, a damper having urging force is disposed in a printing path and the damper absorbs the tension generated if the paper sheet is pulled out by making the paper sheet that is pulled out abut on the damper, thereby alleviating the impact.

By the way, as the continuous paper, there are front-wound continuous paper in which a printing surface (surface that comes into contact with a print head) faces a front side (outside) of a wound paper sheet and back-wound continuous paper in which the printing surface faces a back side (inside) of the wound paper sheet. For this reason, a damper for front-wound continuous paper on which the front-wound continuous paper abuts and a damper for back-wound continuous paper on which the back-wound continuous paper abuts are respectively provided.

However, when loading a paper sheet pulled out from the front-wound continuous paper and back-wound continuous paper into an apparatus, since the paper sheets need to pass between the damper for front-wound continuous paper and the damper for back-wound continuous paper, setting the paper takes time and labor.

DETAILED DESCRIPTION

Embodiments provide a printer and a paper conveyance apparatus that can easily set paper even if stored continuous paper is front-wound continuous paper or back-wound continuous paper.

In general, according to one embodiment, there is provided a printer equipped with a storage portion capable of storing front-wound continuous paper with a printing surface on a front side and back-wound continuous paper with a printing surface on a back side, the printer including a main body, a cover capable of being opened and closed relative to the main body, a print head that prints on the printing surfaces of the front-wound continuous paper and the back-wound continuous paper pulled out from the storage portion, a damper for back-wound continuous paper provided in the main body and capable of being urged in a direction abutting on a non-printing surface of the back-wound continuous paper pulled out from the storage portion, and a damper for front-wound continuous paper provided on the cover and capable of being urged in a direction abutting on the printing surface of the front-wound continuous paper pulled out from the storage portion.

First Embodiment

The first embodiment will be described below. In the first embodiment, a thermal printer will be described as an example of a printer. Further, a long receipt paper sheet made of thermosensitive paper and a long label paper sheet with a plurality of thermosensitive labels attached to a mount will be described as examples of continuous paper. The printer and the paper conveyance apparatus of an exemplary embodiment are not limited to the embodiments described below.

A thermal printer is a receipt printer that is connected to, for example, a POS terminal and prints on stored roll-shaped continuous paper (thermosensitive paper). The thermal printer is a label printer that prints, for example, on a plurality of labels (thermosensitive paper) arranged on stored roll-shaped continuous paper (mounting paper). The thermal printer includes a thermal head and a platen. In the thermal printer, the platen rotates to pull out the continuous paper and the thermal head prints on a printing surface. The printed continuous paper is discharged from a paper discharge port by rotation of the platen. An apparatus that conveys the continuous paper that is pulled out is referred to as a paper conveyance apparatus. The paper conveyance apparatus may be a thermal printer itself, or may be an apparatus that does not include the thermal head and supplies paper to the thermal printer, for example.

Figure 1:
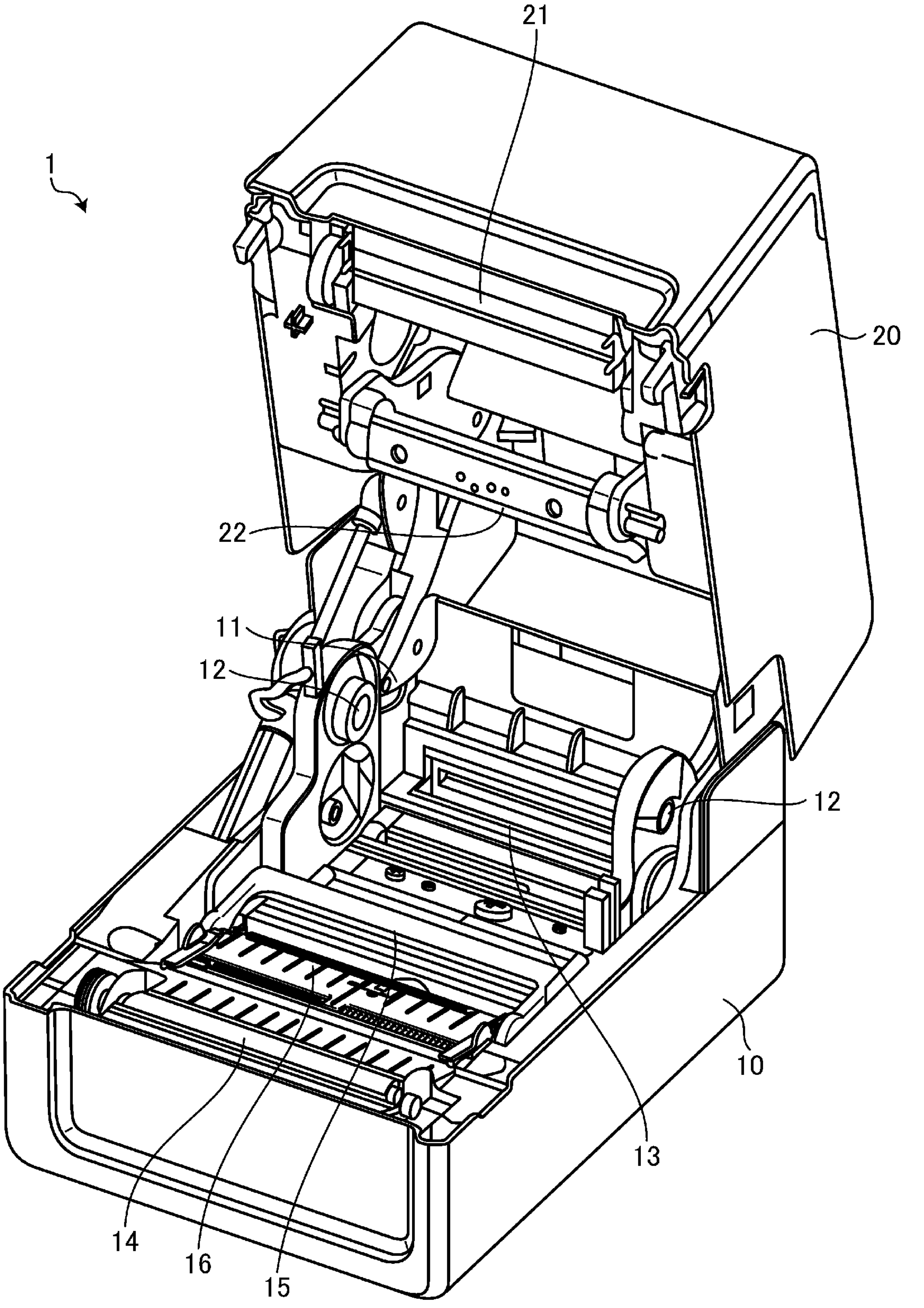
FIG. 1 is an external perspective view of a printer of an embodiment with a top cover opened.

FIG. 1 is an external perspective view of a thermal printer 1 of an embodiment. As illustrated in FIG. 1, the thermal printer 1 includes a main body 10 and a cover 20. The cover 20 is attached to the main body 10 so as to be openable and closable. Specifically, the cover 20 is supported on one side of the main body 10 by a shaft, and is rotatable about the shaft in an opening direction and a closing direction with respect to the main body 10. If the cover 20 rotates in the opening direction (that is, the cover 20 is opened relative to the main body 10), the inside of the thermal printer 1 is exposed, and continuous paper can be stored and set. If the continuous paper is stored and set and the cover 20 rotates in the closing direction (that is, the cover 20 is closed relative to the main body 10), the thermal printer 1 becomes able to print characters, figures, and the like on the set continuous paper.

FIG. 1 illustrates the thermal printer 1 with the cover 20 open with respect to the main body 10. The main body 10 is a substantially rectangular casing with the top side open. The main body 10 includes a hinge portion 11, a holding portion 12, a storage portion 13, a platen 14, a damper for back-wound continuous paper 15, a guide portion 16, and the like.

The hinge portion 11 is positioned at the rear part of the main body 10, and is a support shaft that rotatably attaches the cover 20 to an upper part of the main body 10. The cover 20 attached to the hinge portion 11 is rotatable between an open position and a closed position using the hinge portion 11 as a rotation fulcrum. The position illustrated in FIG. 1 is the open position, and the position closed relative to the main body 10 is the closed position.

The holding portion 12 pivotally supports the continuous paper. The storage portion 13 is an area that stores continuous paper. The holding portion 12 pivotally supports the continuous paper with the continuous paper stored in the storage portion 13. The continuous paper pivotally supported by the holding portion 12 can rotate around the holding portion 12 while being stored in the storage portion 13. The continuous paper may be of a throw-in type that is not pivotally supported by the holding portion 12. In this case, the holding portion 12 is not required, and the continuous paper is stored in the storage portion 13 without being pivotally supported.

The platen 14 is made of rubber, for example, and has a cylindrical shape, and is provided at a position facing a print head 21, which will be described later. The platen 14 rotates to convey the continuous paper from the storage portion 13 toward the print head 21. The guide portion 16 is a plate-shaped member that forms a conveyance path that guides the continuous paper stored in the storage portion 13 to the platen 14 and the print head 21.

The damper for back-wound continuous paper 15 is rotatably attached to the main body 10. The damper for back-wound continuous paper 15 is positioned between the storage portion 13 and the platen 14.

The damper for back-wound continuous paper 15 is urged by a torque spring (not illustrated). The damper for back-wound continuous paper 15 is rotated by urging force and is made to abut on back-wound continuous paper Pa (details will be described later with reference to FIG. 2) pulled out from the storage portion 13. Then, the damper for back-wound continuous paper 15 presses the back-wound continuous paper Pa to a position where the urging force and the tension of the abutting back-wound continuous paper Pa are balanced, and then stops. If the back-wound continuous paper Pa is conveyed by the platen 14, an impact is generated due to the increase in the tension of the back-wound continuous paper Pa, but the damper for back-wound continuous paper 15 rotates (moves) to the opposite side (counter-urging direction) to an urging direction against the urging force due to the increased tension, thereby absorbing and alleviating the generated impact.

The cover 20 has a substantially square shape, has the bottom side open, and closes an opening of the main body 10 while being closed to the main body 10. The cover 20 is attached to the rear upper part of the main body 10 by the hinge portion 11. The cover 20 is rotatable using the hinge portion 11 as a fulcrum. If the cover 20 is opened relative to the main body 10, an opening of the main body 10 is exposed, and if the cover 20 is closed relative to the main body 10, the opening of the main body 10 is closed.

The cover 20 includes the print head 21 and a damper for front-wound continuous paper 22. The print head 21 is, for example, a thermal head in which heating elements are arranged in a line in a direction orthogonal to a conveyance direction of continuous paper (arrow Ya direction (see FIG. 4)). The print head 21 is positioned at a position facing the platen 14 and is made to abut on the platen 14 while the cover 20 is being closed relative to the main body 10. If a paper sheet is set, the print head 21 and the platen 14 pinch the paper sheet. The print head 21 prints on the printing surface of the paper sheet that is conveyed as the platen 14 rotates, by causing the heating element to generate heat according to data.

The damper for front-wound continuous paper 22 is rotatably attached to the cover 20. The damper for front-wound continuous paper 22 is positioned between the storage portion 13 and the print head 21 while the cover 20 is being closed.

The damper for front-wound continuous paper 22 is urged by a torque spring (not illustrated). The damper for front-wound continuous paper 22 is rotated by the urging force and is made to abut on front-wound continuous paper Pb (details will be described later with reference to FIG. 3) pulled out from the storage portion 13. Then, the damper for front-wound continuous paper 22 presses the front-wound continuous paper Pb to a position where the urging force and the tension of the abutting front-wound continuous paper Pb are balanced, and then stops. If the front-wound continuous paper Pb is conveyed by the platen 14, an impact is generated due to the increase in the tension of the front-wound continuous paper Pb, but the damper for front-wound continuous paper 22 rotates (moves) to the opposite side (counter-urging direction) to the urging direction against the urging force due to the increased tension, thereby absorbing and alleviating the generated impact.

From here on, continuous paper will be described. The continuous paper is a roll-shaped paper sheet that is wound around a long paper sheet. As the continuous paper, there are the back-wound continuous paper Pa and the front-wound continuous paper Pb. The back-wound continuous paper Pa refers to continuous paper whose printing surface (the surface on which the print head 21 is made to abut and prints) is the back side (inside) of the wound paper sheet. The front-wound continuous paper Pb refers to continuous paper whose printing surface is the front side (outside) of the wound paper sheet.

Figure 2:
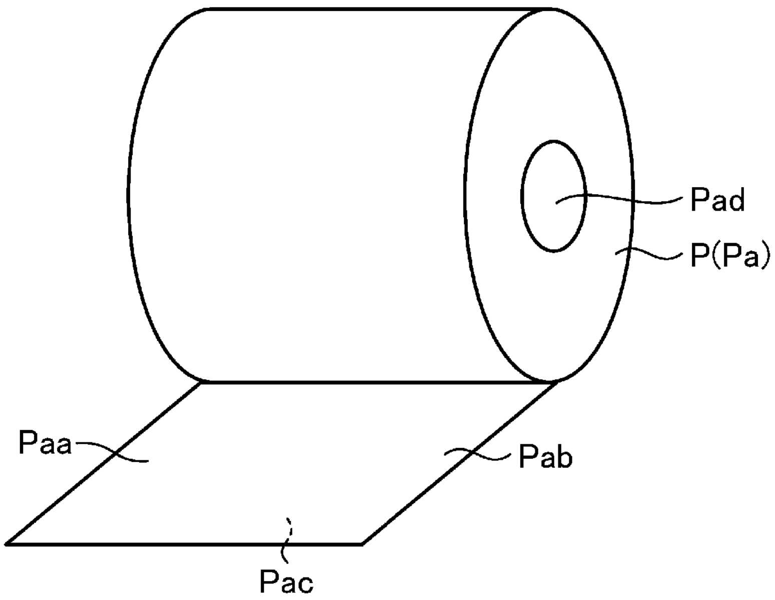
FIG. 2 is a diagram illustrating back-wound continuous paper.

FIG. 2 illustrates the back-wound continuous paper Pa. Specifically, FIG. 2 is a diagram illustrating the back-wound continuous paper Pa and a paper sheet Paa pulled out from the outermost periphery of the back-wound continuous paper Pa. As illustrated in FIG. 2, in the back-wound continuous paper Pa, a back surface Pab (inner surface of back-wound continuous paper Pa) of the paper sheet Paa is a printing surface (that is, the printing surface is the back side of paper sheet Paa) coated with thermal ink, and a front surface Pac (outer surface of back-wound continuous paper Pa) of the paper sheet Paa is a non-printing surface. In the back-wound continuous paper Pa, a cylindrical hole Pad that penetrates in the width direction of the paper sheet is formed in the center thereof. The paper sheet Paa is pulled out and set until the paper sheet Paa is pinched between the platen 14 and the print head 21.

Figure 3:
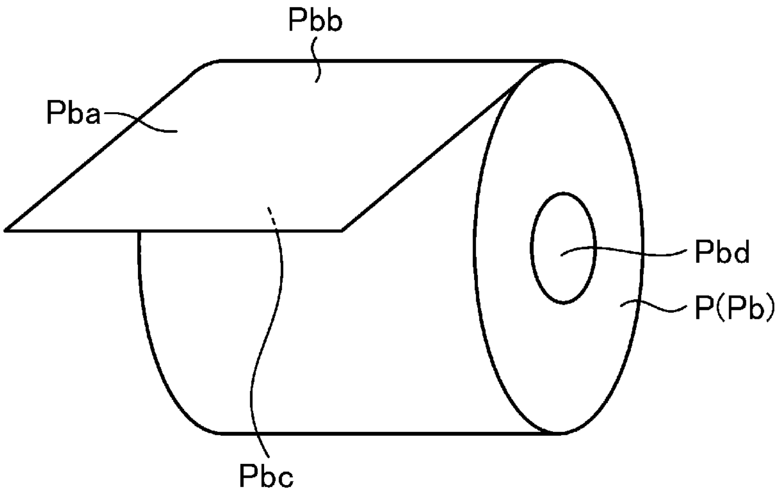
FIG. 3 is a diagram illustrating front-wound continuous paper.

FIG. 3 illustrates the front-wound continuous paper Pb. Specifically, FIG. 3 is a diagram illustrating the front-wound continuous paper Pb and a paper sheet Pba pulled out from the outermost periphery of the front-wound continuous paper Pb. As illustrated in FIG. 3, in the front-wound continuous paper Pb, a front surface Pbb (outer surface of front-wound continuous paper Pb) of the paper sheet Pba is a printing surface (that is, the printing surface is the front side of paper sheet Pba) coated with thermal ink, and a back surface Pbc (inner surface of front-wound continuous paper Pb) of the paper sheet Pba is a non-printing surface. In the front-wound continuous paper Pb, a cylindrical hole Pbd that penetrates in the width direction of the paper sheet is formed in the center thereof. The paper sheet Pba is pulled out and set until the paper sheet Pba is pinched between the platen 14 and the print head 21.

Hereinafter, when referring to both the back-wound continuous paper Pa and the front-wound continuous paper Pb, or when either of the back-wound continuous paper Pa or the front-wound continuous paper Pb may be used, the back-wound continuous paper Pa and the front-wound continuous paper Pb will be referred to as continuous paper P.

Figure 4:
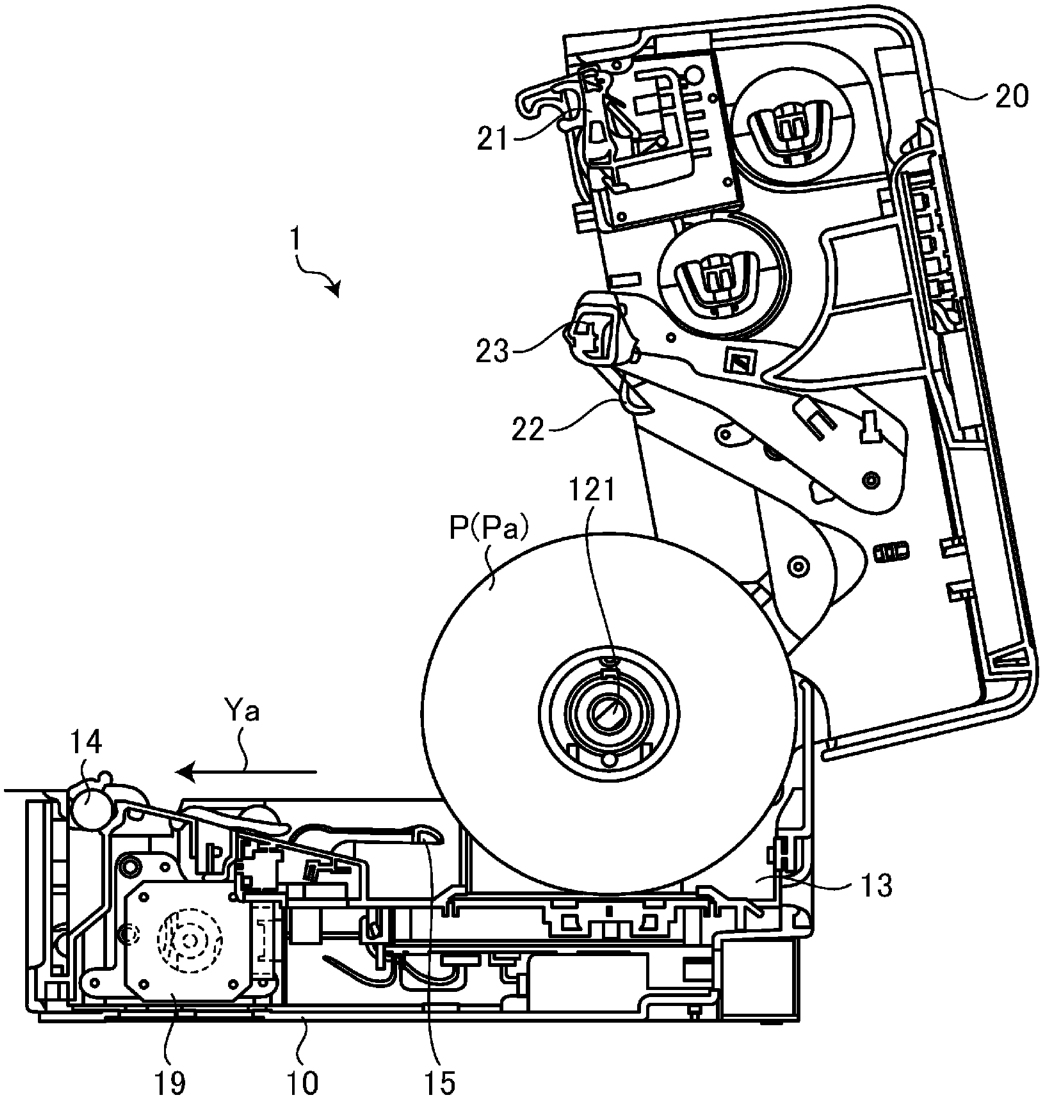
FIG. 4 is an explanatory diagram of the printer with the top cover opened when viewed from a side.

FIG. 4 is a diagram illustrating a state in which the cover 20 is opened from the main body 10 in the thermal printer 1. FIG. 4 illustrates a state in which the back-wound continuous paper Pa is attached to the storage portion 13. In FIG. 4, the back-wound continuous paper Pa is pivotally supported by the holding portion 12 through the support shaft 121 in the hole Pad. In this state, the back-wound continuous paper Pa is rotatably attached to the holding portion 12 within the storage portion 13. In FIG. 4, paper sheet Paa is not yet pulled out. The front-wound continuous paper Pb is also rotatably attached to the holding portion 12 in the same manner.

The main body 10 is equipped with a drive motor 19. The drive motor 19 is, for example, a stepping motor. The drive motor 19 is a motor that serves as a drive source for rotating the platen 14. That is, the drive motor 19 is a conveyance motor that conveys the continuous paper P.

The print head 21, the damper for front-wound continuous paper 22, and a paper detection sensor 23 are attached to the cover 20. The paper detection sensor 23 detects the presence or absence of continuous paper P. Specifically, the paper detection sensor 23 detects the presence or absence of the paper sheets Paa and Pba pulled out from the continuous paper P and set while the cover 20 is being closed relative to the main body 10.

As illustrated in FIG. 4, while the cover 20 is being opened from the main body 10, the upper part of the main body 10 is opened. Since the damper for back-wound continuous paper 15 is attached to the main body 10 side and the damper for front-wound continuous paper 22 is attached to the cover 20 side, a structure, in which the damper for front-wound continuous paper 22 moves upward as the cover 20 is opened, is separated from the damper for back-wound continuous paper 15, and the storage portion 13 is opened, is adopted. Therefore, the continuous paper P can be easily stored in the storage portion 13 and attached to the holding portion 12. Since the structure in which the damper for front-wound continuous paper 22 moves upward as the cover 20 is opened and the damper for front-wound continuous paper 22 and the damper for back-wound continuous paper 15 are separated is adopted, the paper sheet Paa or Pba can be pulled out from the continuous paper P attached to the holding portion 12 and set at the position of the platen 14 by passing the paper sheet through between the separated damper for back-wound continuous paper 15 and damper for front-wound continuous paper 22. Therefore, even if the continuous paper P attached to the holding portion 12 is the front-wound continuous paper Pb or the back-wound continuous paper Pa, the continuous paper P can be easily set. If the cover 20 is closed, the set paper sheet Paa or Pba is pinched between the platen 14 and the print head 21, printed by the print head 21, and conveyed in the direction of arrow Ya as the platen 14 rotates.

Figure 5:
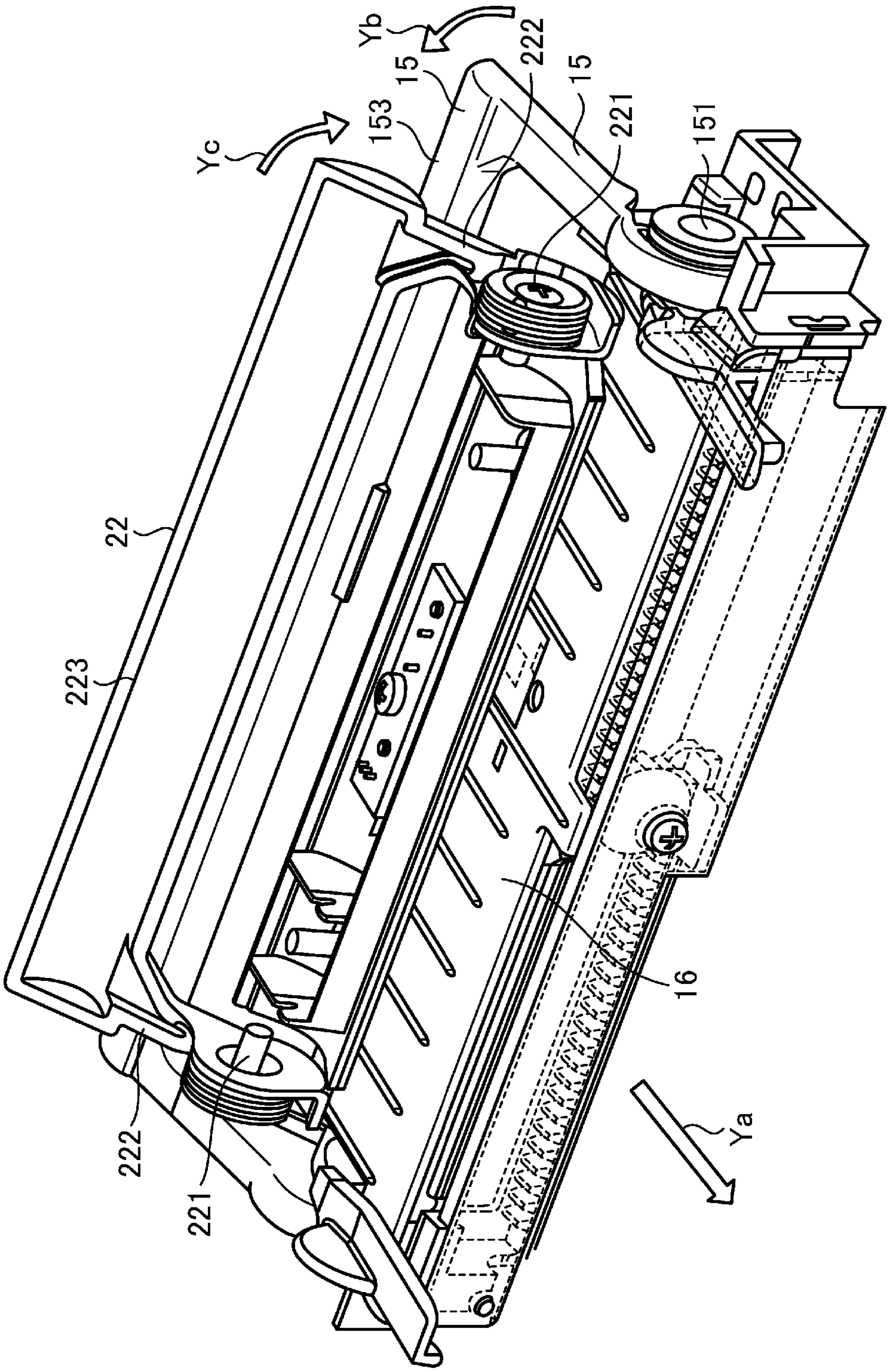
FIG. 5 is a perspective view illustrating a configuration of a damper for front-wound continuous paper and a damper for back-wound continuous paper.

From here on, the configurations of the damper for back-wound continuous paper 15 and the damper for front-wound continuous paper 22 will be described. FIG. 5 is a perspective view illustrating the structures of the damper for back-wound continuous paper 15 and the damper for front-wound continuous paper 22.

The damper for back-wound continuous paper 15 is attached to the main body 10. The damper for back-wound continuous paper 15 includes a pair of support shaft portions 151 (first support shaft), a pair of arm portions 152, and an abutment portion 153. The support shaft portions 151 are attached to both sides of the guide portion 16 of the main body 10 so as to be rotatable with respect to the main body 10.

The arm portions 152 are arms extending from both the support shaft portions 151 toward the storage portion 13, respectively. The abutment portion 153 is formed to connect both arm portions 152 at an extending end, and has a curved surface. The curved surface of the abutment portion 153 abuts on the back-wound continuous paper Pa. A length of the abutment portion 153 in the width direction of the paper sheet is longer than a width of the back-wound continuous paper Pa conveyed in the direction of arrow Ya.

The support shaft portion 151 is provided with a built-in torque spring (not illustrated). The torque spring urges the arm portion 152 and the abutment portion 153 to rotate in the direction of arrow Yb. That is, the damper for back-wound continuous paper 15 is urged in the direction of arrow Yb by the torque spring. The direction of arrow Yb is a direction in which the damper for back-wound continuous paper 15 is made to abut on the front surface Pac (non-printing surface) of the paper sheet Paa and is a direction in which the abutting front surface Pac (non-printing surface) is pushed toward the back surface Pab (printing surface), if the paper sheet Paa is pulled out from the back-wound continuous paper Pa attached to the holding portion 12 and set. In FIG. 5, the direction of arrow Yb is the direction in which the damper for back-wound continuous paper 15 is made to abut on the front surface Pac (non-printing surface) of the paper sheet Paa from below. That is, the damper for back-wound continuous paper 15 is urged upward from the bottom of the main body 10 and can be made to abut on the non-printing surface of the paper sheet Paa, and urges the abutting paper sheet Paa from the non-printing surface side to the printing surface side.

The damper for front-wound continuous paper 22 is attached to the cover 20. The damper for front-wound continuous paper 22 includes a pair of support shaft portions (second support shaft) 221, a pair of arm portions 222, and an abutment portion 223. The support shaft portions 221 are attached to both sides of the cover 20 so as to be rotatable with respect to the cover 20.

The arm portions 222 are arms extending from both the support shaft portions 221 toward the storage portion 13, respectively. The abutment portion 223 is formed to connect both arm portions 222 at an extending end, and has a curved surface. The curved surface of the abutment portion 223 abuts on the front-wound continuous paper Pb. A length of the abutment portion 223 in the width direction of the paper sheet is longer than a width of the front-wound continuous paper Pb conveyed in the direction of arrow Ya.

The support shaft portion 221 is provided with a built-in torque spring (not illustrated). The torque spring urges the arm portion 222 and the abutment portion 223 to rotate in the direction of arrow Yc. That is, the damper for front-wound continuous paper 22 is urged in the direction of arrow Yc by the torque spring. The direction of arrow Yc is a direction in which the damper for front-wound continuous paper 22 is made to abut on the front surface Pbb (printing surface) of the paper sheet Pba and is a direction in which the abutting front surface Pbb (printing surface) is pushed toward the back surface Pbc, if the paper sheet Pba is pulled out from the front-wound continuous paper Pb attached to the holding portion 12 and set. In FIG. 5, the direction of arrow Yc is the direction in which the damper for front-wound continuous paper 22 is made to abut on the front surface Pbb (printing surface) of the paper sheet Pba from above. That is, the damper for front-wound continuous paper 22 is urged toward the main body 10 from the cover 20 side and can be made to abut on the printing surface of the paper sheet Pba, and urges the abutting paper sheet Pba from the printing surface side to the non-printing surface side.

A distance from the abutment portion 153 to the platen 14 and a distance from the abutment portion 223 to the platen 14 are desirable to be as same as possible. By adopting such a configuration, the degree of impact alleviation by the damper for back-wound continuous paper 15 and the degree of impact alleviation by the damper for front-wound continuous paper 22 become approximately the same. Therefore, printing quality of approximately the same degree can be ensured when using the back-wound continuous paper Pa and when using the front-wound continuous paper Pb.

Figure 6:
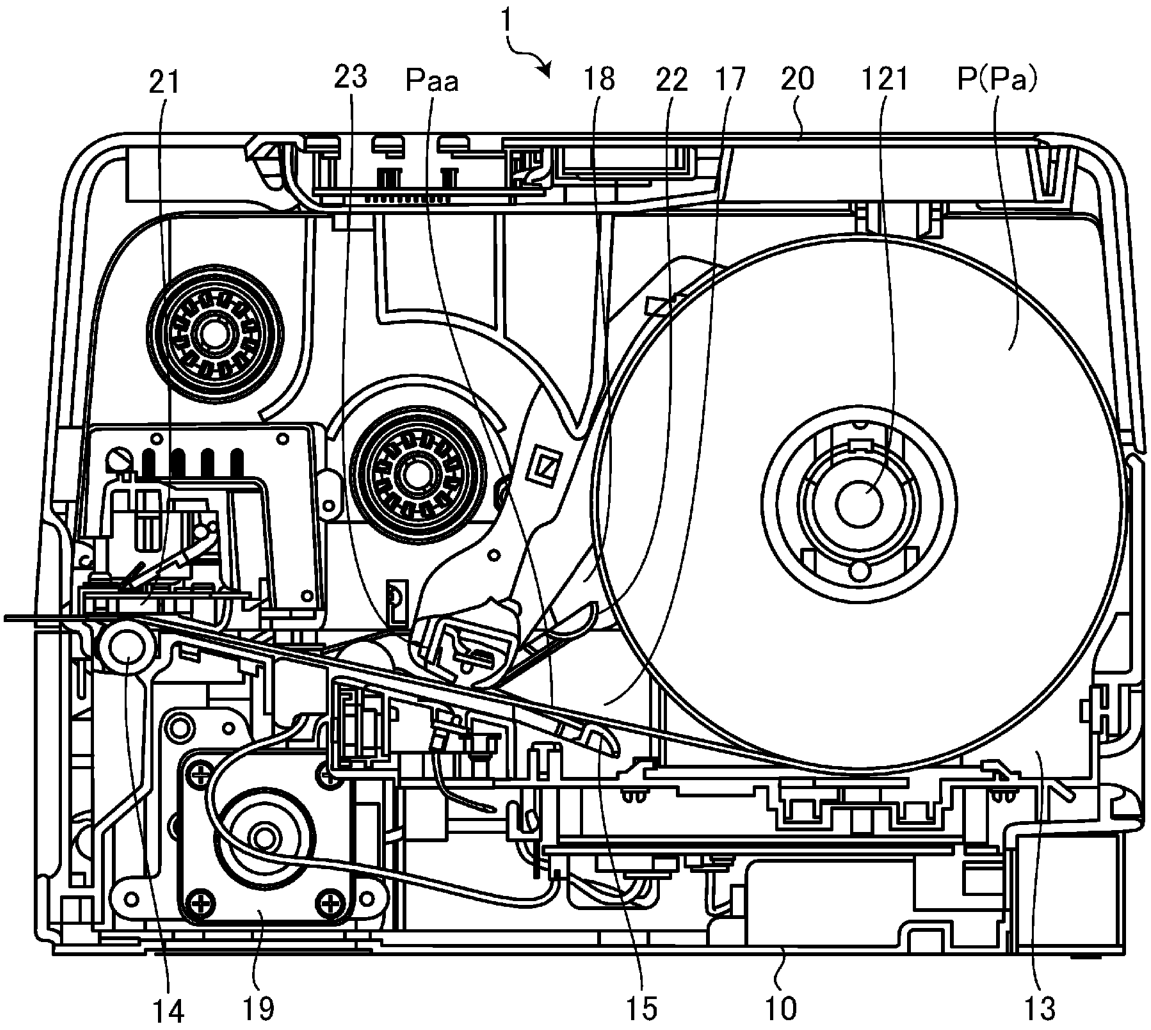
FIG. 6 is an explanatory diagram of the printer loaded with back-wound continuous paper when viewed from the side.

FIG. 6 is an explanatory diagram of the inside of the thermal printer 1, while being in a state where the back-wound continuous paper Pa is attached to the holding portion 12 and the cover 220 is closed relative to the main body 10, when viewed from the side. As illustrated in FIG. 6, the damper for back-wound continuous paper 15 is attached so as to be disposed in close proximity to a pullout port 17 for pulling out the paper sheet Paa from the storage portion 13 that stores the continuous paper P. Therefore, the space that was conventionally a dead space near the pullout port 17 can be effectively utilized.

In FIG. 6, the damper for back-wound continuous paper 15 is urged by the torque spring and rotates in the direction of arrow Yb in FIG. 5. Then, if the back-wound continuous paper Pa is held by the holding portion 12 and the paper sheet Paa is pulled out and set, the abutment portion 153 of the damper for back-wound continuous paper 15 is made to abut on the front surface Pac (outer surface (non-printing surface) of back-wound continuous paper Pa) of the paper sheet Paa. Then, the abutment portion 153 (that is, damper for back-wound continuous paper 15) is pushed back to a position where the tension of the paper sheet Paa and the urging force of the damper for back-wound continuous paper 15 are balanced.

Figure 8:
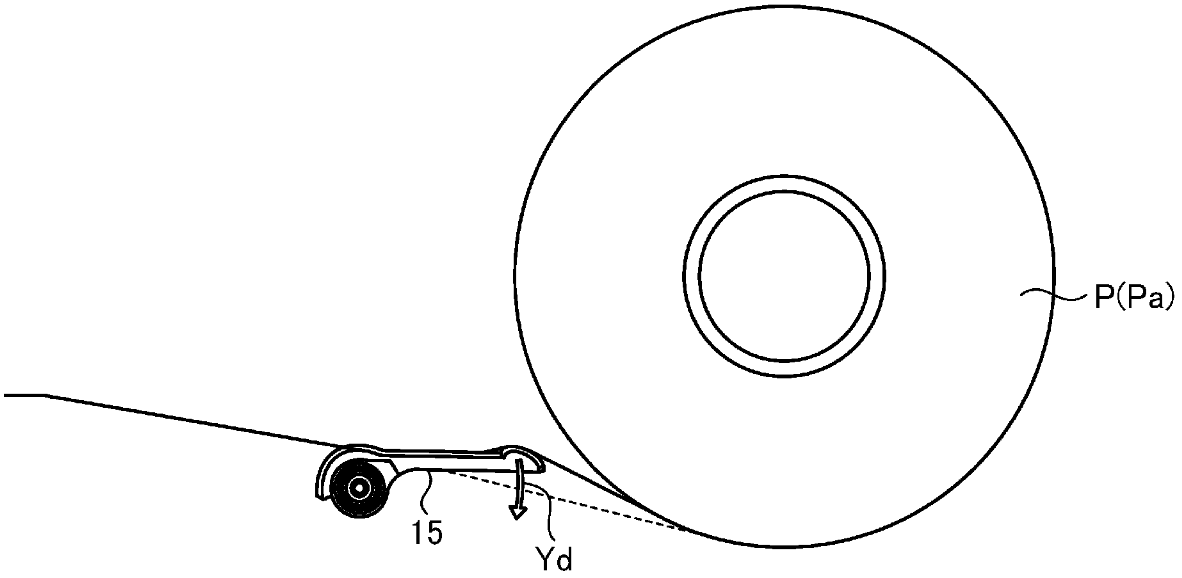
FIG. 8 is a diagram for illustrating impact alleviation by a damper for back-wound continuous paper 15.

FIG. 8 illustrates a state where the damper for back-wound continuous paper 15 is positioned at the position where the urging force of the damper for back-wound continuous paper 15 and the tension of the paper sheet Paa are balanced. The paper sheet Paa is bent to the position illustrated by the solid line by the urging force of the damper for back-wound continuous paper 15.

If the platen 14 rotates in this state and starts conveying the set paper sheet Paa, the tension of the paper sheet Paa increases. However, the back-wound continuous paper Pa is still in a stopped state. If this state continues, there is a possibility that an impact may be generated due to the back-wound continuous paper Pa being suddenly pulled by the increased tension, but as illustrated in FIG. 8, the damper for back-wound continuous paper 15 moves in the direction of arrow Yd against the urging force by receiving increased tension. By moving the damper for back-wound continuous paper 15 in the direction of arrow Yd to the position indicated by the dotted line (or close to the position indicated by the dotted line) in this manner, the tension increased by conveyance of the paper sheet Paa is absorbed to some extent and is not directly transmitted to the back-wound continuous paper Pa. Therefore, the impact caused by conveying the paper sheet Paa can be alleviated. The tension caused by conveying the paper sheet Paa is transmitted to the back-wound continuous paper Pa while the impact is alleviated by the damper for back-wound continuous paper 15, and thus the back-wound continuous paper Pa starts rotating as the paper sheet Paa is conveyed.

Figure 7:
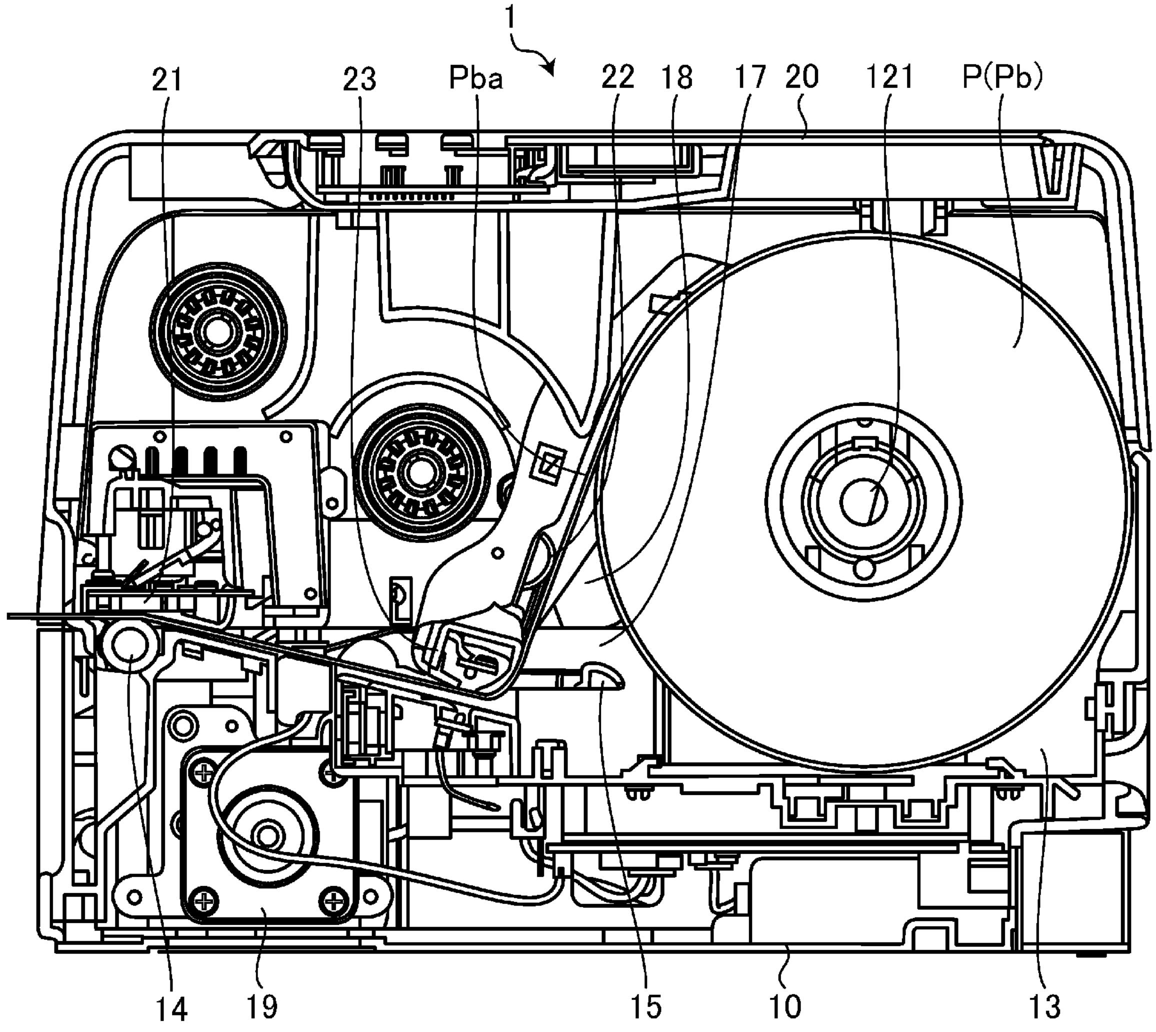
FIG. 7 is an explanatory diagram of the printer loaded with front-wound continuous paper when viewed from the side.

FIG. 7 is an explanatory diagram of the inside of the thermal printer 1, while being in a state where the front-wound continuous paper Pb is attached to the holding portion 12 and the cover 220 is closed relative to the main body 10, when viewed from the side. As illustrated in FIG. 7, the damper for front-wound continuous paper 22 is attached so as to be disposed in close proximity to a pullout port 18 for pulling out the paper sheet Pba from the storage portion 13 that stores the continuous paper P. Therefore, the space that was conventionally a dead space near the pullout port 18 can be effectively utilized.

In FIG. 7, the damper for front-wound continuous paper 22 is urged by the torque spring and rotates in the direction of arrow Yc in FIG. 5. Then, if the front-wound continuous paper Pb is held by the holding portion 12 and the paper sheet Pba is pulled out and set, the abutment portion 223 of the damper for front-wound continuous paper 22 is made to abut on the front surface Pbb (outer surface (printing surface) of front-wound continuous paper Pb) of the paper sheet Pba. Then, the abutment portion 223 (that is, damper for front-wound continuous paper 22) is pushed back to a position where the tension of the paper sheet Pba and the urging force of the damper for front-wound continuous paper 22 are balanced.

Figure 9:
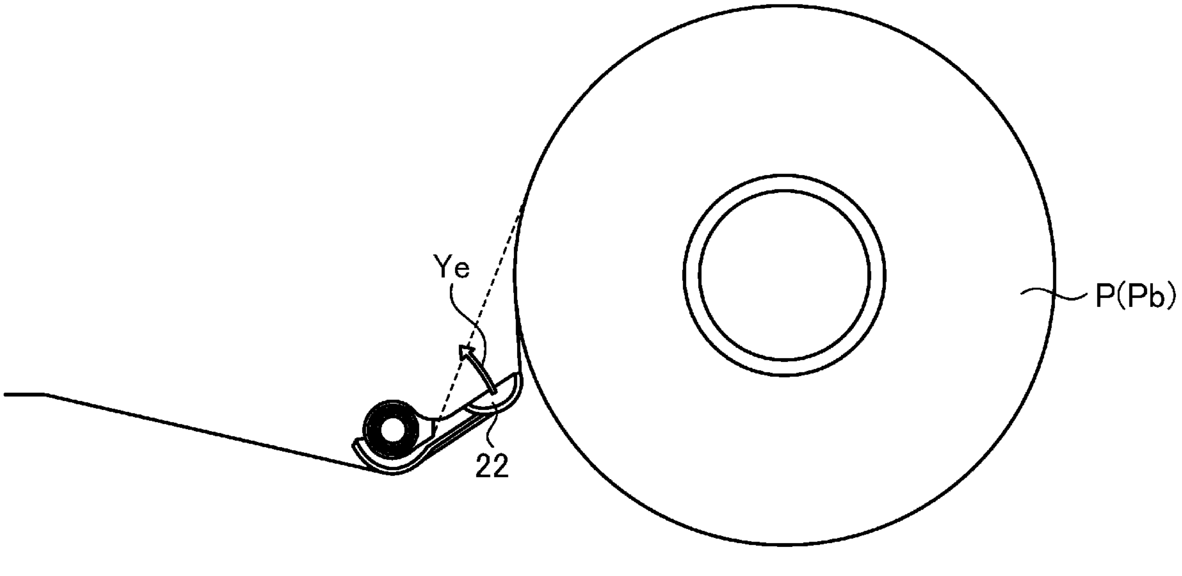
FIG. 9 is a diagram for illustrating impact alleviation by a damper for front-wound continuous paper 22.

FIG. 9 illustrates a state where the damper for front-wound continuous paper 22 is positioned at the position where the urging force of the damper for front-wound continuous paper 22 and the tension of the paper sheet Pba are balanced. The paper sheet Pba is bent to the position illustrated by the solid line by the urging force of the damper for front-wound continuous paper 22.

If the platen 14 rotates in this state and starts conveying the set paper sheet Pba, the tension of the paper sheet Pba increases. However, the front-wound continuous paper Pb is still in a stopped state. If this state continues, there is a possibility that an impact may be generated due to the front-wound continuous paper Pb being suddenly pulled by the increased tension, but as illustrated in FIG. 9, the damper for front-wound continuous paper 22 moves in the direction of arrow Ye against the urging force by receiving increased tension. By moving the damper for front-wound continuous paper 22 in the direction of arrow Ye to the position indicated by the dotted line (or close to the position indicated by the dotted line) in this manner, the tension increased by conveyance of the paper sheet Pba is absorbed to some extent and is not directly transmitted to the front-wound continuous paper Pb. Therefore, the impact caused by conveying the paper sheet Pba can be alleviated. The tension caused by conveying the paper sheet Pba is transmitted to the front-wound continuous paper Pb while the impact is alleviated by the damper for front-wound continuous paper 22, and thus the front-wound continuous paper Pb starts rotating as the paper sheet Pba is conveyed.

As described above, the thermal printer 1 of the first embodiment is the thermal printer 1 including the storage portion 13 capable of storing the front-wound continuous paper Pb with a printing surface on a front side and the back-wound continuous paper Pa with a printing surface on a back side, and includes the main body 10, the cover 20 capable of being opened and closed relative to the main body 10, the print head 21 that prints on the printing surfaces of the front-wound continuous paper Pb and the back-wound continuous paper Pa pulled out from the storage portion 13, the damper for back-wound continuous paper 15 provided in the main body 10 and capable of being urged in a direction abutting on the front surface Pac of the back-wound continuous paper Pa pulled out from the storage portion 13, and the damper for front-wound continuous paper 22 that is provided on the cover 20 and capable of being urged in a direction abutting on the front surface Pbb of the front-wound continuous paper Pb pulled out from the storage portion 13.

According to the thermal printer 1 of the first embodiment, if the cover 20 is opened from the main body 10, the damper for back-wound continuous paper 15 and the damper for front-wound continuous paper 22 are separated, and thus the paper sheets (paper sheet Paa and paper sheet Pba) can be easily set even if the stored continuous paper P is the front-wound continuous paper Pb or the back-wound continuous paper Pa.

The paper conveyance apparatus of the first embodiment is a paper conveyance apparatus equipped with the storage portion 13 capable of storing the front-wound continuous paper Pb with a printing surface on a front side and the back-wound continuous paper Pa with a printing surface on a back side, and includes the main body 10, the cover 20 capable of being opened and closed relative to the main body 10, the damper for back-wound continuous paper 15 provided in the main body 10 and capable of being urged in a direction abutting on the front surface Pac of the back-wound continuous paper Pa pulled out from the storage portion 13, and the damper for front-wound continuous paper 22 that is provided on the cover 20 and capable of being urged in a direction abutting on the front surface Pbb of the front-wound continuous paper Pb pulled out from the storage portion 13.

According to the paper conveyance apparatus of the first embodiment, if the cover 20 is opened from the main body 10, the damper for back-wound continuous paper 15 and the damper for front-wound continuous paper 22 are separated, and thus the paper sheets (paper sheet Paa and paper sheet Pba) can be easily set even if the stored continuous paper P is the front-wound continuous paper Pb or the back-wound continuous paper Pa.

Second Embodiment

From here on, the second embodiment will be described. In the thermal printer 1 of the second embodiment, the print head 21 and the platen 14 are provided on opposite sides compared to the thermal printer 1 of the first embodiment. That is, in the thermal printer 1 of the second embodiment, the print head 21 is attached to the main body 10, and the platen 14 is attached to the cover 20. The print head 21 is attached at the position of the platen 14 of the first embodiment, and the platen 14 is attached at the position of the print head 21 of the first embodiment.

In the second embodiment, the damper for back-wound continuous paper 15 of the first embodiment is read as the damper for front-wound continuous paper 15. Further, the damper for front-wound continuous paper 22 of the first embodiment is read as the damper for back-wound continuous paper 22. That is, the damper for front-wound continuous paper 15 is attached to the main body 10, and the damper for back-wound continuous paper 22 is attached to the cover 20. The structures of the damper for front-wound continuous paper 15 and the damper for back-wound continuous paper 22 are the same as in the first embodiment. The damper for front-wound continuous paper 15 abuts on the front surface Pbb of the front-wound continuous paper Pb. The damper for back-wound continuous paper 22 abuts on the front surface Pac of the back-wound continuous paper Pa. The method of alleviating the impact using the damper for front-wound continuous paper 15 and the damper for back-wound continuous paper 22 is the same as that illustrated in FIGS. 7 and 9. Further, the other configurations of the thermal printer 1 of the second embodiment are the same as those of the thermal printer 1 of the first embodiment.

Such a thermal printer 1 of the second embodiment is the thermal printer 1 including the storage portion 13 capable of storing front-wound continuous paper Pb with a printing surface on a front side and back-wound continuous paper Pa with a printing side on a back side, and includes the main body 10, the cover 20 capable of being opened and closed relative to the main body 10, the print head 21 that prints on the printing surfaces of the front-wound continuous paper Pb and the back-wound continuous paper Pa pulled out from the storage portion 13, the damper for back-wound continuous paper 22 provided on the cover 20 and capable of being urged in a direction abutting on the front surface Pac of the back-wound continuous paper Pa pulled out from the storage portion 13, and the damper for front-wound continuous paper 15 provided in the main body 10 and capable of being urged in a direction abutting on the front surface Pbb of the front-wound continuous paper Pb pulled out from the storage portion 13.

In the thermal printer 1 of the second embodiment having such a configuration, the damper for front-wound continuous paper 15 abuts on the front surface Pbb of the front-wound continuous paper Pb. Further, the damper for back-wound continuous paper 22 abuts on the front surface Pac of the back-wound continuous paper Pa.

According to the paper conveyance apparatus of the second embodiment, if the cover 20 is opened from the main body 10, the damper for front-wound continuous paper 15 and the damper for back-wound continuous paper 22 are separated, and thus the paper sheets (paper sheet Paa and paper sheet Pba) can be easily set even if the stored continuous paper P is the front-wound continuous paper Pb or the back-wound continuous paper Pa.

While the first and second embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the embodiments, the printer is described as the thermal printer 1 using a thermal head. However, the printer of an exemplary embodiment is not limited thereto, and the printer may be any other printer that uses continuous paper P, such as an inkjet printer or a wire dot printer.

Furthermore, in the embodiments, the platen 14 is rotated to convey the paper sheet. However, the printer of an exemplary embodiment is not limited thereto, and may be provided with a mechanism for conveying a paper sheet in addition to the platen 14.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer equipped with a storage portion configured to store front-wound continuous paper with a printing surface on a front side and back-wound continuous paper with a printing surface on a back side, the printer comprising:

a main body;

a cover configured to open and close relative to the main body;

a print head that prints on the printing surfaces of the front-wound continuous paper and the back-wound continuous paper pulled out from the storage portion;

a first damper for back-wound continuous paper provided in the main body, the first damper configured to be urged in a direction abutting on a non-printing surface of the back-wound continuous paper pulled out from the storage portion; and a second damper for front-wound continuous paper provided on the cover, the second damper configured to be urged in a direction abutting on the printing surface of the front-wound continuous paper pulled out from the storage portion.

2. The printer according to claim 1, wherein the first damper for back-wound continuous paper is rotatable around a first support shaft provided on the main body, and the second damper for front-wound continuous paper is rotatable around a second support shaft provided on the cover.

3. The printer according to claim 1, wherein the first damper for back-wound continuous paper is provided in close proximity to a pullout port of the back-wound continuous paper of the storage portion, and the second damper for front-wound continuous paper is provided in close proximity to a pullout port of the front-wound continuous paper of the storage portion while the cover is being closed.

4. The printer according to claim 1, further comprising:

a guide portion that guides the back-wound continuous paper urged by the first damper for back-wound continuous paper and the front-wound continuous paper urged by the second damper for front-wound continuous paper to the print head.

5. The printer according to claim 1, wherein the first damper includes a pair of support shaft portions, a pair of arm portions, and an abutment portion.

6. The printer according to claim 1, wherein the second damper includes a pair of support shaft portions, a pair of arm portions, and an abutment portion.

7. A paper conveyance apparatus equipped with a storage portion configured to store front-wound continuous paper with a printing surface on a front side and back-wound continuous paper with a printing surface on a back side, the paper conveyance apparatus comprising:

a main body;

a cover configured to open and close relative to the main body;

a first damper for back-wound continuous paper provided in the main body, the first damper configured to be urged in a direction abutting on a non-printing surface of the back-wound continuous paper pulled out from the storage portion; and a second damper for front-wound continuous paper provided on the cover, the second damper configured to be urged in a direction abutting on the printing surface of the front-wound continuous paper pulled out from the storage portion.

8. The paper conveyance apparatus according to claim 7, wherein the first damper for back-wound continuous paper is rotatable around a first support shaft provided on the main body, and the second damper for front-wound continuous paper is rotatable around a second support shaft provided on the cover.

9. The paper conveyance apparatus according to claim 7, wherein the first damper for back-wound continuous paper is provided in close proximity to a pullout port of the back-wound continuous paper of the storage portion, and the second damper for front-wound continuous paper is provided in close proximity to a pullout port of the front-wound continuous paper of the storage portion while the cover is being closed.

10. The paper conveyance apparatus according to claim 7, further comprising:

a guide portion that guides the back-wound continuous paper urged by the first damper for back-wound continuous paper and the front-wound continuous paper urged by the second damper for front-wound continuous paper to the print head.

11. The paper conveyance apparatus according to claim 7, wherein the first damper includes a pair of support shaft portions, a pair of arm portions, and an abutment portion.

12. The paper conveyance apparatus according to claim 7, wherein the second damper includes a pair of support shaft portions, a pair of arm portions, and an abutment portion.

13. A printer equipped with a storage portion configured to store front-wound continuous paper with a printing surface on a front side and back-wound continuous paper with a printing surface on a back side, the printer comprising:

a main body;

a cover capable of being opened and closed relative to the main body;

a print head that prints on the printing surfaces of the front-wound continuous paper and the back-wound continuous paper pulled out from the storage portion;

a first damper for back-wound continuous paper provided on the cover, the first damper configured to be urged in a direction abutting on a non-printing surface of the back-wound continuous paper pulled out from the storage portion; and a second damper for front-wound continuous paper provided in the main body, the second damper configured to be urged in a direction abutting on the printing surface of the front-wound continuous paper pulled out from the storage portion.

14. The printer according to claim 13, wherein the first damper for back-wound continuous paper is rotatable around a first support shaft provided on the cover, and the second damper for front-wound continuous paper is rotatable around a second support shaft provided on the main body.

15. The printer according to claim 13, wherein the first damper for back-wound continuous paper is provided in close proximity to a pullout port of the front-wound continuous paper of the storage portion, and the second damper for front-wound continuous paper is provided in close proximity to a pullout port of the back-wound continuous paper of the storage portion while the cover is being closed.

16. The printer according to claim 13, further comprising: a guide portion that guides the back-wound continuous paper urged by the first damper for back-wound continuous paper and the front-wound continuous paper urged by the second damper for front-wound continuous paper to the print head.

17. The printer according to claim 13, wherein the first damper includes a pair of support shaft portions, a pair of arm portions, and an abutment portion.

18. The printer according to claim 13, wherein the second damper includes a pair of support shaft portions, a pair of arm portions, and an abutment portion.

* * * * *